United States Patent
Furlong

[15] 3,706,270
[45] Dec. 19, 1972

[54] PRESSURE CONTROL SYSTEMS

[72] Inventor: Owen Desmond Furlong, East Coker, England

[73] Assignee: Westland Aircraft Limited, Yeouil, Somerset, England

[22] Filed: Nov. 10, 1970

[21] Appl. No.: 88,377

[30] Foreign Application Priority Data

Dec. 9, 1969 Great Britain.....................59,982/69

[52] U.S. Cl........................................98/1.5, 137/81
[51] Int. Cl. ...............................................B64d 13/04
[58] Field of Search ...........................98/1.5; 137/81

[56] References Cited

UNITED STATES PATENTS 1,631,262   6/1927   Gordou..................................137/81

*Primary Examiner*—Meyer Perlin
*Attorney*—Larson, Taylor and Hinds

[57] ABSTRACT

In or for an enclosure pressure control system of the type wherein enclosure pressure varying means are operated by fluid pressure signals from a fluidic control pack, a fluid pressure controller or emergency pressure controller comprises an aneroid type capsule operating a valve at a preselected enclosure pressure to bleed away excess fluid pressure signals which would normally operate the pressure varying means, thereby maintaining a controlled pressure within the enclosure should malfunction of the normal fluidic control system occur. The capsule is in a closed chamber which communicates with the enclosure atmosphere through a resistive orifice, and the path of the bled pressure fluid passes through the chamber, whereby the resistive orifice introduces a negative feedback signal. The capsule is supported in the chamber by a spring loaded plunger which is manually actuatable from the exterior of the chamber to provide for ground tests of the device.

11 Claims, 1 Drawing Figure

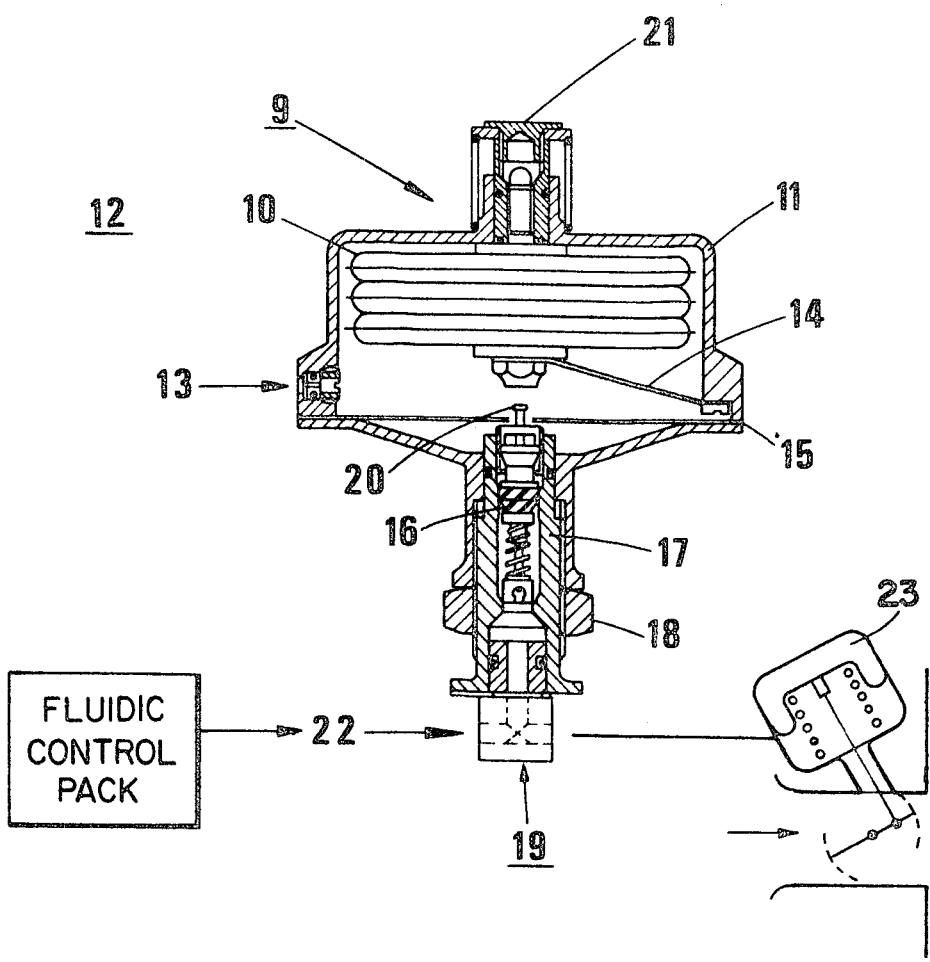

PRESSURE CONTROL SYSTEMS

This invention relates to fluid pressure control systems, and more specifically to fluid pressure controllers for use in conjunction with fluid pressure control systems, or in conjunction with rate of environmental change sensing devices connected into fluid pressure control systems, as emergency controllers for controlling the pressure of an enclosed space in the event of failure of the normal control system.

Fluid pressure control systems and rate of environmental change sensing devices for use in fluid pressure control systems such as described in U.S. Pat. No. 3,559,559 are, as are all systems, subject to breakdown or malfunction. Rare though these breakdowns or malfunctions may be, a breakdown or malfunction in an aircraft cabin control system at altitude could be disastrous unless an emergency means of controlling pressure, and the rate of change thereof, within the cabin existed. Basically with these systems pressure increasing and pressure decreasing means, actuated by fluid pressure from a power relay within the system, open or close vents in the cabin wall to maintain the pressure within the cabin at a pre-selected value, and at the same time ensure that the rate of change of pressure within the cabin is kept within prescribed limits.

It is an object of this invention to provide a fluid pressure controller in, or for use in conjunction with, a fluid pressure control system, such as referred to above, to operate as an emergency controller operable to bleed away excess pressure from the fluid pressure signals which normally control the pressure increasing or pressure decreasing means, should malfunction of the system occur.

Generally in accordance with the invention, the foregoing object is achieved by a fluid pressure controller comprising an absolute pressure sensing capsule operable, at a preselected cabin altitude, to bleed off excess pressure from the normally controlling pressure fluid signals. The capsule preferably is located within a chamber located in the enclosure, and the chamber communicates with the enclosure atmosphere through a resistive orifice, the chamber and the resistive orifice forming part of the bleed path of the excess fluid pressure signal.

Other and further objects, features and the like of the invention will become apparent from the ensuing description of a preferred embodiment, taken in conjunction with the accompanying drawing, which illustrates diagrammatically a preferred embodiment.

The control valve was designed specifically for aircraft use, to prevent the cabin depressurizing to a dangerously high altitude should certain major failure conditions ever occur in the normal fluidic pressure control system. One possible failure condition, i.e. the breakage of the control line between the cabin altitude selector and the fluidic control pack, can result in higher control pressures being fed to the discharge valve(s) and subsequent depressurization of the cabin. In principle, therefore, the emergency controller simply has to bleed away the excess pressure to the discharge valve actuator when a preset maximum cabin altitude is reached.

Referring to the diagram, the controller 9 includes an absolute pressure sensing capsule 10 enclosed within a housing 11 sealed from the aircraft cabin 12, except for an outlet orifice 13, which has a combined cabin pressure sensing port and feedback resistor bleed. The capsule 10 is stabilized within the housing 11 by a spring yoke 14. The lower half of the controller 9 below a sealing ring 15 includes a schrader cored valve 16, the position of which can be variably set by valve adjuster 17 and locknut 18. The controller is connected into the main pressure control system such that the output signal 22 from the fluidic control pack passes through connector 19 before reaching the discharge valve actuator chamber 23.

When, for example, an emergency condition occurs and the cabin starts to depressurize, the pressure within housing 11 decreases, capsule 10 expands, comes into contact with the valve actuator 20 which opens the valve and permits pressure to bleed from the connector 19 through the valve to cabin via housing 11 and outlet orifice 13, this relieves the excess pressure to the discharge valve which then closes.

To hold the cabin pressure within satisfactory limits without instability, the design incorporates an additional negative feedback feature to supply the desired damping effect. Because of the resistance of the outlet orifice 13, the capsule housing 11 pressurizes slightly, relative to cabin pressure as the flow from the bleed increases, thus introducing a negative feedback signal into the control.

As the volume of housing 11 is small, the flow in and out of orifice 13 that is required for the capsule 10 to follow changes in cabin altitude, is also small compared with the through flow when the bleed valve 16 is in operation. The orifice 13 thus causes only negligible lag to the system in following cabin altitude variations, and does not result in undesirable pressure rise or pressure drop when the cabin is changing altitude very rapidly.

The shape of the outlet orifice 13 dictates the form of the negative feedback characteristic of the system, and can be chosen to optimize requirements. If, for example, it is designed as a nest of capillary tubes, then the feedback signal will increase linearly with the flow from the bleed valve 16. If, on the other hand, it is designed as a sharp-edged orifice, the feedback signal will vary as the square of the bleed flow. Other orifice configurations can be selected to give characteristics between these extremes. As an example, a 0.060 inch diameter flat plate orifice was found to stabilize a particular system adequately.

Since the emergency controller of the present invention will not normally be called upon to work, it is desirable that it should incorporate the facility of being ground tested, to check that it may be functioning properly. As can be seen from the drawing the controller 9 has its capsule 10 mounted on a spring-loaded plunger 21, capable of sliding in the housing 11 by depression of the plunger. The unit can be operated on the ground for test purposes, i.e., press the plunger to test operation of the controller, often referred to as a "press to test" facility.

I claim as my invention:

1. For use in an enclosure pressure control system of the type wherein enclosure pressure increasing or decreasing means are operated by fluid pressure signals from a fluid control system, an emergency pressure controller comprising a body having a bleed connector passage therein adapted to be connected in the system to communicate with the fluid pressure signals controlling the enclosure pressure increasing or decreasing means, a normally closed valve controlling said bleed connector passage so that the bleed connector passage will not normally affect the pressure fluid signals, a pressure sensing capsule for sensing the pressure in the enclosure and opening said valve when the absolute enclosure pressure falls below a pre-selected value, thereby to bleed the pressure signals and prevent their operative effect on the pressure increasing or decreasing means, said body including a chamber with which said bleed connector passage communicates, said capsule being located in said chamber, and an enclosure pressure sensing orifice in the chamber wall for rendering said chamber sensitive to pressure variations in the enclosure, said sensing orifice comprising a resistive outlet orifice relative to said bleed connector passage such that such chamber will vary in pressure relative to enclosure pressure when said valve is open, thus effecting a negative feedback signal to the capsule, and means for adjusting the operative relationship between said valve and said capsule so as to adjust the enclosure pressure at which the capsule opens the valve.

2. Apparatus as claimed in claim 1 wherein said capsule is of the aneroid type.

3. Apparatus as claimed in claim 1 wherein said capsule is movably supported in said chamber for movement as a whole in valve opening and closing directions, and further comprising manually actuatable means on the exterior of said body for effecting such movement, whereby to permit ground testing of the pressure controller.

4. Apparatus as claimed in claim 3 wherein said manually actuatable means comprises a spring loaded plunger passing through the wall of said chamber, and coupled to said capsule inside said chamber.

5. In an enclosure pressure control system having a pressure varying means and a fluidic control system for passing fluid pressure signals to the pressure varying means to normally control the operation thereof and thus control the pressure in the enclosure, an overriding emergency pressure controller for bleeding excess fluid pressure signals in response to predetermined pressure levels in said enclosure, said pressure controller comprising a body member having a bleed connector passage in normally non-disruptive communication with said pressure fluid signals so as normally not to disrupt the free passage of said signals from said fluidic control system to said pressure varying means, and means, including an enclosure absolute pressure sensing capsule and a valve, for normally closing said bleed connector passage so that it will not affect said fluid pressure signals but for opening said bleed connector passage at a pre-determined pressure level in said enclosure to bleed excess pressure signals and prevent their operative effect on said pressure varying means, said valve normally closing said bleed connector passage, and said pressure sensing capsule opening said valve at a pre-determined pressure level in said enclosure, said body including a chamber with which said bleed connector passage communicates, said capsule being located in said chamber, and an orifice in the chamber wall for rendering said chamber sensitive to pressure variation in the enclosure and for bleeding said excess pressure signals from said chamber when said valve is open.

6. Apparatus as claimed in claim 5 wherein said orifice comprises a resistive outlet orifice relative to said bleed connector passage such that said chamber will vary in pressure relative to enclosure pressure when said valve is open, thus effecting a negative feedback signal to the capsule.

7. Apparatus as claimed in claim 6 further comprising means for adjusting the operative relationship between said valve and said capsule so as to adjust the enclosure pressure at which the capsule opens the valve.

8. Apparatus as claimed in claim 7 wherein said capsule is of the aneroid type.

9. Apparatus as claimed in claim 7 wherein said capsule is movably supported in said chamber for movement as a whole in valve opening and closing directions, and further comprising manually actuatable means on the exterior of said body for effecting such movement, whereby to permit ground testing of the pressure controller.

10. Apparatus as claimed in claim 9 wherein said manually actuatable means comprises a spring loaded plunger passing through the wall of said chamber, and coupled to said capsule inside said chamber.

11. Apparatus as claimed in claim 5 wherein said enclosure is an aircraft cabin, said pressure varying means is a pneumatically operated vent valve for venting the enclosure to the atmosphere, and high pressure fluid signals tend to open said vent valve.

* * * * *